US006977661B1

(12) United States Patent  
Stokes et al.

(10) Patent No.: US 6,977,661 B1  
(45) Date of Patent: Dec. 20, 2005

(54) SYSTEM AND METHOD FOR APPLYING COLOR MANAGEMENT ON CAPTURED IMAGES

(75) Inventors: Michael D. Stokes, Redmond, WA (US); Franc J. Camara, Redmond, WA (US); David M. Parsons, Kirkland, WA (US); Gilman K. Wong, Redmond, WA (US); Vladimir Sadovsky, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 505 days.

(21) Appl. No.: 09/696,390

(22) Filed: Oct. 25, 2000

Related U.S. Application Data

(60) Provisional application No. 60/185,034, filed on Feb. 25, 2000.

(51) Int. Cl.[7] ............................................. G09G 5/02
(52) U.S. Cl. ...................... 345/589; 345/591; 345/593; 345/603; 345/604; 358/518; 382/162; 382/167; 715/764; 719/321; 719/328
(58) Field of Search ............................... 345/589–593, 345/603, 604; 709/321, 323, 371; 358/518; 382/162; 715/764; 719/321–329

(56) References Cited

U.S. PATENT DOCUMENTS

| | | | | |
|---|---|---|---|---|
| 5,835,098 A | * | 11/1998 | Lipton | 345/589 |
| 5,923,824 A | * | 7/1999 | Yokomizo | 358/1.9 |
| 6,137,595 A | * | 10/2000 | Sakuyama et al. | 358/1.9 |
| 6,167,456 A | * | 12/2000 | Daur et al. | 709/321 |
| 6,373,507 B1 | * | 4/2002 | Camara et al. | 345/825 |
| 6,463,173 B1 | * | 10/2002 | Tretter | 382/168 |
| 6,489,973 B1 | * | 12/2002 | Heiden | 345/771 |
| 6,611,621 B2 | * | 8/2003 | Shiraiwa | 382/167 |
| 2002/0126147 A1 | * | 9/2002 | Lavendel et al. | 345/764 |
| 2003/0177448 A1 | * | 9/2003 | Levine et al. | 715/530 |

OTHER PUBLICATIONS

Morehouse, Dave. "What's New In Device and Hardware Support." Jun. 1, 2001. Microsoft TechNet Website. http://www.microsoft.com/technet/prodtechnol/winxppro/evaluate/hwsprtxp.mspx. Date accessed Jul. 9, 2004.*

* cited by examiner

Primary Examiner—Matthew C. Bella  
Assistant Examiner—Antonio Caschera  
(74) Attorney, Agent, or Firm—Lee & Hayes, PLLC

(57) ABSTRACT

A system and method for image acquisition enables selective automated application of color management to color image data generated by an image-capturing device by the device driver for the device. In the image acquisition system, each image-capturing device has properties or operation parameters that can be set to control the operation of the device. During an image acquisition operation, color image data generated by the image-capturing device are transmitted to the device driver. If the operation parameters of the device are set to indicate that color management is to be performed, the device driver calls color management functions provided by the operating system to perform the desired color operation, such as a color space conversion, on the received color image data. The processed color image data are then sent to the image-processing application for further processing or editing.

28 Claims, 4 Drawing Sheets

SYSTEM AND METHOD FOR APPLYING COLOR MANAGEMENT ON CAPTURED IMAGES

CROSS REFERENCE TO RELATED APPLICATIONS

This application claims the benefit of provisional patent application Ser. No. 60/185,034, filed Feb. 25, 2000.

TECHNICAL FIELD OF THE INVENTION

This invention relates generally to computer graphics and digital images, and more particularly to performing color management operations on color image data captured by an image-capturing device, such as a digital camera or a scanner.

BACKGROUND OF THE INVENTION

Digital image-capturing devices, such as scanners, digital still-image cameras and digital video cameras, are experiencing a rapid growth in popularity and are becoming increasingly affordable. One factor contributing to that growth is the availability of popular software applications and system tools that allow an average user to perform various rather sophisticated graphic operations on a captured image to obtain results with a reasonably good quality. Another factor contributing to that growth is that it has become commonplace for a user to use color images creatively in various forms of presentations and communications. Many users create their own original color images by using the image-capturing devices. For instance, a user can use a digital camera to take a picture of her family, edit the picture by performing compositing, morphing, color correction, or various other editing operations, then display or print the edited color image, insert the image in a presentation document or a Web page, or attach the image to an e-mail.

After an image is obtained with an image-capturing device, the color data of the image often have to go through some forms of color processing. Such color processing typically includes a color space conversion, because the color data generated by an image-capturing device are generally in a device-specific color space that is different from the color space or spaces used by the image-processing application for image editing. Besides a color space conversion, color corrections or filtering may also be performed on the color image data.

Since image acquisition using image-capturing devices has become an increasingly important part of computer usage, it is desirable to provide a way to makes it simpler for an average user to handle color processing of captured images. With existing color-capturing devices and image processing applications, however, either very simple color adjustments are performed at the front end of the data chain by the device or device driver, or very complicated color management operations requiring extensive user involvement is performed at the back end of the chain on the application level. In the existing color acquisition systems, there is no automation for advanced color management and no coordination to prevent duplicate color processing along the data chain. In particular, a color space conversion is typically performed on the application level. To perform the color space conversion operation, the user may be asked to specify the source and destination color spaces of the conversion and identify the color profiles to be used in the conversion. Such an approach assumes that the user has a good operative knowledge of color theories and various color spaces. Such knowledge is beyond the average consumers targeted by most of the image-capturing devices and image-processing applications. Accordingly, there is a need for a way to allow automated and flexible application of color management on color image data generated by image-capturing devices with minimal user involvement.

SUMMARY OF THE INVENTION

In view of the foregoing, the present invention provides a system and method for image acquisition that enables automated application of advanced color management operations at the level of the device driver of an image-capturing device. As a result, color management on captured image data can be selectively applied by an image processing application without the need for extensive user involvement. The image acquisition system in accordance with the invention is based on an architecture in which each image-capturing device has properties or operation parameters that can be set by the image-processing application to control the operation of the device. During an image acquisition operation, color image data generated by the image-capturing device are transmitted to the device driver. If a property indicating whether color management is to be performed is set, the device driver calls one or more appropriate color management functions provided by the operating system to perform the desired color operation, such as a color space conversion, on the received color image data. The device driver then forwards the processed color image data to image-processing application for further processing or editing. In this way, relatively advanced color management functionality provided by the operating system can be automatically and selectively applied to a captured color image, without the need for extensive user involvement.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
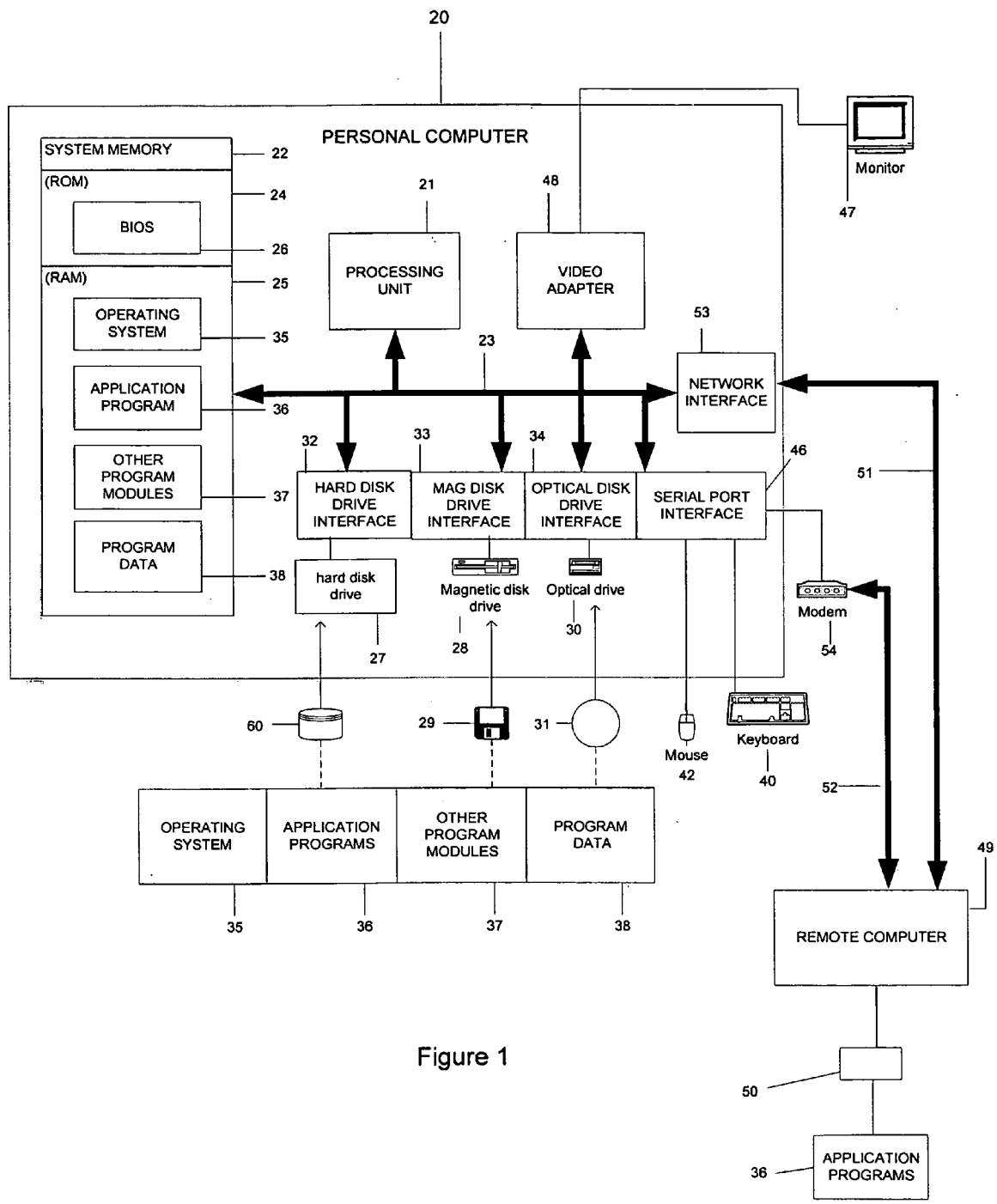
FIG. 1 is a block diagram generally illustrating an exemplary computer system on which the present invention may be performed.

Turning to the drawings, wherein like reference numerals refer to like elements, the invention is illustrated as being implemented in a suitable computing environment. For illustration purposes, a typical personal computer system is described in connection with FIG. 1, and the invention will be described in detail in reference to FIG. 2 and the remaining Figures. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, mini-computers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general-purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices may include a microphone, joystick, game pad, or the like. Especially important for purposes of the invention, the input devices may include image-capturing devices, such as scanners and digital cameras, as sources of color image data. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
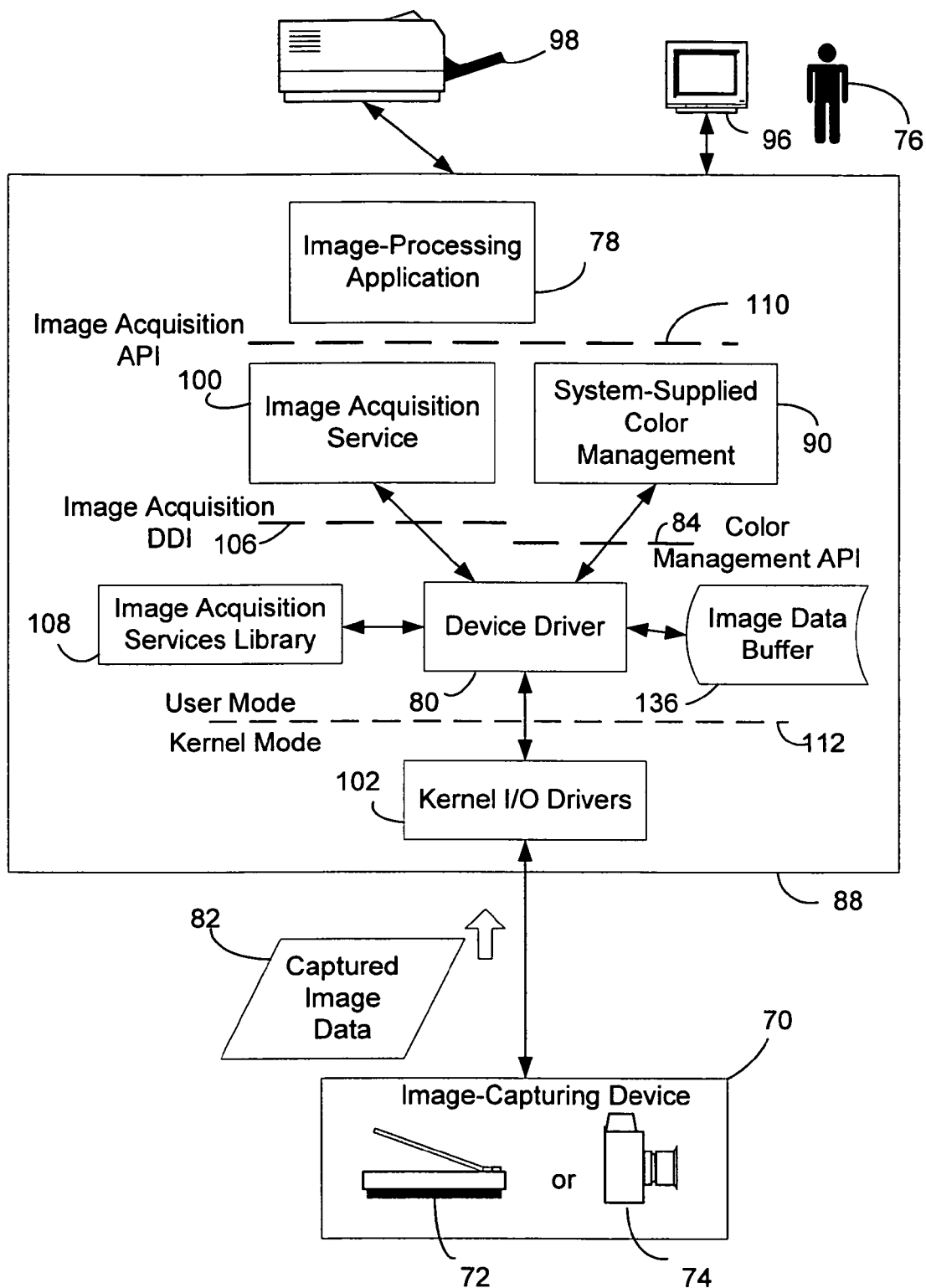
FIG. 2 is a schematic diagram showing an embodiment of an image acquisition system in which color management functionality provided by the operating system may be selectively applied to color image data captured by an image-capturing device at a device driver level.

Referring now to FIG. 2, the present invention is directed to an image acquisition system and method that enables automated color management to be selectively applied to color image data generated by an image-capturing device 70, such as a digital camera 72, a scanner 74, or another type of image-capturing device, with minimal involvement of a user 76. As will be described in greater detail below, the automated color management on captured images is based on an image acquisition system in which an image-processing application 78 is enabled to set operation parameters (or properties) of an image-capturing device 70. By setting appropriate properties of the image-capturing device 70, the application 78 can control the device driver 80 of the image-capturing device to selectively apply color management on the captured image data 82. To that end, an interface 84 is provided through which the device driver 80 can call a color management component 90 provided by the operating system 88 to perform various color management functions, such as a color space conversion, on image data received from the image-capturing device. Alternatively and/or additionally, a user interface may be provided by the application or the operating system to allow the user to select the application of color management at the device level. Moreover, the decision to apply color management at the device level may also be made by the operating system.

In the following description, the invention will be described in the context of an embodiment based on the Windows Image Acquisition (WIA) architecture, which is part of the Windows operating system of Microsoft Corporation. It will be appreciated, however, that the system and method for applying color management operations on captured images in accordance with the invention can also be implemented for use with other types of operating systems.

In the embodiment shown in FIG. 2, the computer system may have one or more image-capturing devices, such as scanners 72, digital cameras 74, etc. For simplicity of illustration and description, the following description will refer to a generic image-capturing device 70. The image-capturing device 70 functions as a source of color image data, which can be transmitted to an image-processing application 78 for various types of processing and editing operations. The processed or edited color image may then be displayed on a color display device (such as a computer monitor 96) for viewing, printed on a printer 98, or included in a document for presentation or communication purposes.

In accordance with an aspect of the invention, the operating system 88 of the computer provides advanced color management functionality that can be invoked through appropriate functions of an Application Programming Interface (API) 84. The color management component 90 preferably performs three main functions to improve color consistency across devices and applications: mapping colors between programs, transforming colors, and providing accurate on-screen or print previews for color correction. Without such color management functionality provided by the operating system, the different programs tend to generate their own colors and settings, and consistent color interchange could be severely limited.

To enhance the flexibility and quality of color operations, the color management 90 preferably supports multiple color formats. For instance, in a preferred embodiment, the color management 90 supports color data in the sRGB color space, the scRGB color space, as well as color data with embedded color profile information, such as International Color Consortium (ICC) profiles. The sRGB (which stands for "standard RGB") color space is a device-independent perceptual-based color space that is an international standard (IEC 61966-2-1) based on a proposal by Hewlett-Packard Corporation and Microsoft Corporation. It has a substantially linear gamma with respect to uniform human perception. The scRGB (which stands for "standard capture RGB") is a device-independent physical-based color space that is an international standard draft (IEC 619666-2-2 1CD) based on a proposal by Microsoft Corporation. This color space has a substantially linear gamma with respect to luminance.

In the context of image capturing, one of the primary purposes of applying color management is to convert color data from a source color space to a destination color space. For example, color data in the sRGB space may be converted into the scRGB space, and vice versa, or to the color space of an output device (such as a printer or a display) according to the ICC color profile of that device. Similarly, input color image data such as those generated by an image-capturing device may be converted to a desired color space (e.g., sRGB) for editing operations, and that conversion may be based on an ICC color profile for the input data. The source and destination color spaces are, of course, not limited to the sRGB and/or device spaces. For instance, the conversion may be from the device space to a CMYK space. Also, if the device performs color preprocessing and outputs color data in a given color space such as sRGB, the color conversion may be from that given space to another desired space. In another scenario, a color conversion is not performed, but a source ICC profile is embedded in the image metadata of the captured image. Alternatively, the color conversion is performed and the destination ICC profile is embedded into the image metadata. This allows images to be stored, for example, on a flash memory with the correct colors if the destination color space is not a standard color space.

The color management 90 may also support various color modifications, such as brightness, contrast, and grayscale modifications, etc. The color management may also be used, for instance, to include abstract ICC profiles with the image data and perform color corrections to create a desired effect (e.g., highly saturated images). When a color conversion is to be performed, the color management functions may also be used, for example, to check the difference between the source and destination color spaces to determine whether color conversion is necessary or will significantly impact the color quality of the image.

As mentioned above, in accordance with an aspect of the invention, the operating system 88 of the computer employs an image acquisition architecture that enables an application 78 to communicate with and receive color data from an image-capturing device 70. In a preferred embodiment, the image acquisition architecture includes a system-supplied image acquisition service 100 through which an image processing application preferably can monitor, communicate with, and receive data from image capturing devices. The device driver 80 communicates with both the image capturing device 70 and the image acquisition service 100 and routes requests from the application to the image capturing device and notifies the application when device events, such as data transfer ready events, occur. The image acquisition service 100 works with the device driver 80, which is typically supplied by the vendor of the image-capturing device. As shown in FIG. 2, the device driver 80 communicates with its associated image-capturing device 70 through system-supplied or vendor-supplied kernel-mode I/O device drivers 102, and communicates with the image acquisition service 100 through a Device Driver Interface (DDI) 106 provided by the image acquisition service. The image acquisition architecture further includes a system-supplied services library 108 containing helper functions for assisting in the development of a device driver for use in this architecture.

In the illustrated embodiment, the device driver 80, which is typically vendor-supplied, is a user-mode component that directs image acquisition property changes and commands to its associated image capturing device 70. The image acquisition DDI 106 provides entry points for the image acquisition service 100 to control the device driver 80. The device driver 80 also provides a device-specific user-mode interface 112 to the kernel-mode image driver 102, which drives the imaging device through a driver such as a USB driver. The kernel-mode image driver, which are bus-specific, packages data for delivery to the image-capturing device 70 and transfers data from the image-capturing device to the device driver 80. The communications between the kernel-mode image driver 102 and the image-capturing device 80 may be based on one of different types of buses. For instance, in one implementation, kernel-mode image drivers for the USB, SCSI, and IEEE 1394 buses are provided with the operating system 70.

An image-processing application 78 communicates with the image acquisition service 100 through an image acquisition Application Programming Interface (API) 110 provided by the operating system to access images and acquire image data from the image-capturing device 70. Requests made by the application 78 concerning the image-capturing device 70 are directed to the image acquisition service 100, which in turn directs the requests to the appropriate device driver 80 through the image acquisition Device Driver Interface (DDI) 106. In this way, the application can perform the following device-related operations: installing imaging devices, reading properties of installed devices, creating device objects, monitoring and delivering device events, acquiring device data, and communicating application device requests.

In a preferred embodiment, each image-capturing device 70 is represented logically as a hierarchical tree of image acquisition items. In this logical device model, the root item of a hierarchical tree represents the device, and the child items represent images or folders of the device. A folder may contain images and/or other folders. Each item in the tree has operation properties that can be queried or set by the corresponding device driver. An item is used by an application through the image acquisition service to do things such as obtaining and setting device information, controlling the device operation, and initiating device item enumeration. An application acquires data from an item by requesting a data transfer from the item.

Figure 3:
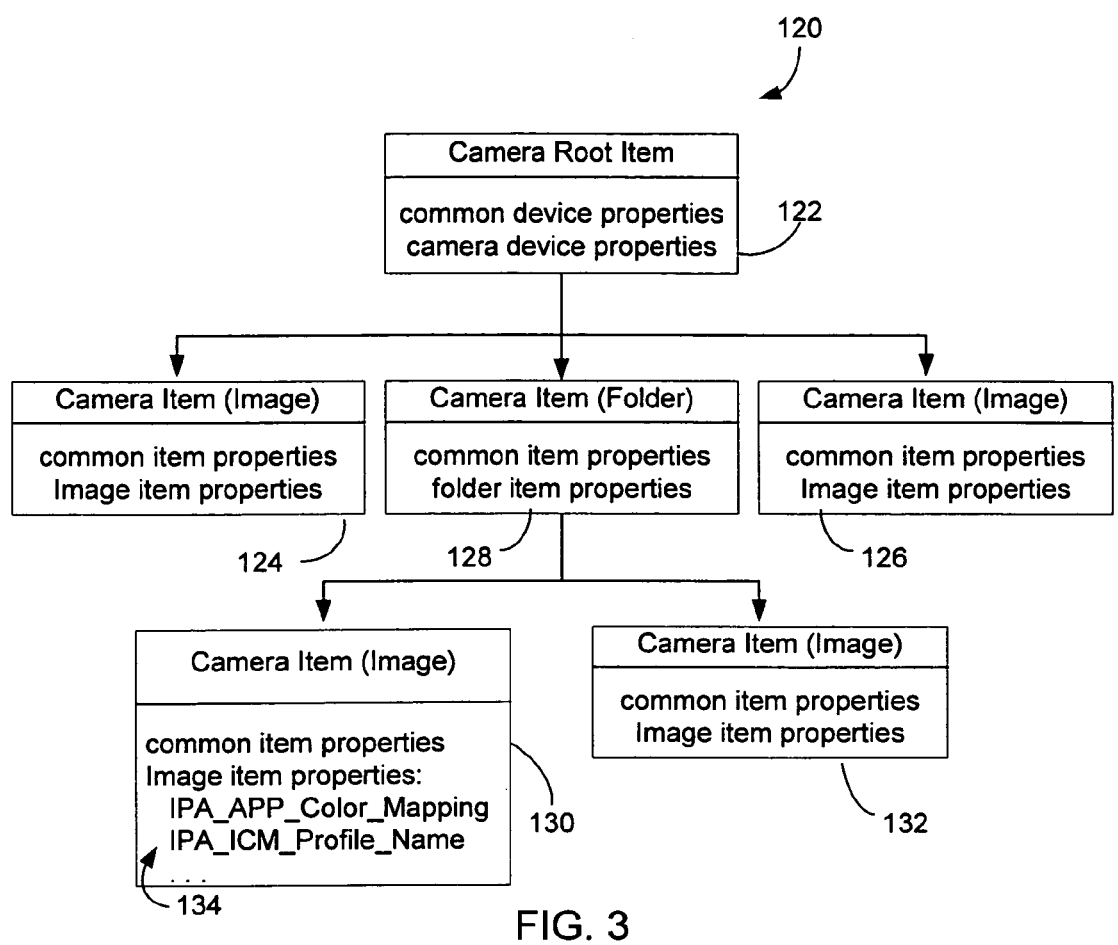
FIG. 3 is a schematic diagram showing an exemplary device item tree model representing an image-capturing device and having image items with settable properties.

By way of example, a sample driver item tree 120 for a digital camera is shown in FIG. 3. In this example, the camera root item 122 has two picture child items 124, 126 and a folder child item 128. The folder item 128 in turn has two child items 130, 132 that are both pictures. Through the use of this device item tree 120, an application 78 can make requests via the image acquisition service 100 to query capabilities of the digital camera, set camera device and picture properties, and request a data transfer. Other items may also be included in this camera device tree to represent, for example, sound data or any other data on the camera that it can provide to the application.

In accordance with a feature of the invention, color management operations, especially color space conversions, can be selectively performed by the device driver on image data generated by the associated image-capturing device 70. Specifically, the image acquisition architecture of the operating system enables the application to control whether color management is to be applied on the device driver level by setting the properties of the device accordingly. Furthermore, appropriate Application Programming Interface (API) 84 functions are provided to enable the device driver to call into the color management functions.

In the illustrated embodiment, by setting the appropriate properties of the image item in the device tree representing the captured image, the application 78 can indicate whether color management is to be applied by the device driver 80, and which color management operations are to be performed. As mentioned above, one important color management operation often to be performed on captured color images is the conversion from the color space of the image-capturing device to a different color space. The image processing application can request the device driver 80 to invoke the color management function for converting the color image data to the desired color space.

As an example, in one embodiment, all device drivers are expected to return captured image data in the sRGB color space by default. If a device driver is not set up otherwise, when it receives image data captured by its associated image-capturing device, it will call the appropriate color management function to convert the color data to the sRGB space. This conversion may be based on an ICC profile of the image-capture device, and the name of the device ICC profile to be used may be identified by one of the item properties (e.g., a property named IPA_ICM_PROFILE_NAME) in the driver item tree representing the device as described above. Some applications, however, may want to have color image data in the scRGB color space, which is more suitable for certain types of color modification operations. Such an application may then set appropriate properties of the device to indicate that a conversion to the scRGB color space is to be performed. Alternatively, some applications may want to perform color management operations (including the color space conversion) by themselves and therefore intend to retrieve image data in the native color space of the image-capturing device. In that case, the application can set the value of a designated driver item property (e.g., a property named IPA_APP_COLOR_MAPPING) to indicate that no color conversion is to be performed by the device driver. The device driver will then send color image data in the native color space of the image-capturing device to the application through the image acquisition service. The selections of whether a color space conversion is to be performed, the destination color space of the conversion, and the color profile to be used in the conversion, etc., may be made by the image-processing application without requiring any user input. If desired, the application may present a user interface to allow a user to make such selections. Alternatively, the user interface for prompting user input for color management decisions may be provided at the system level, i.e., by the image acquisition system instead of at the application level. Thus, even if the color application is not written to take advantage of the flexible color management at the device driver level, the options are still available to the user through the system-level user interface. Furthermore, the decision of whether to apply color management at the driver level may also be made by the operating system, e.g., by the Image Acquisition Service.

Figure 4:
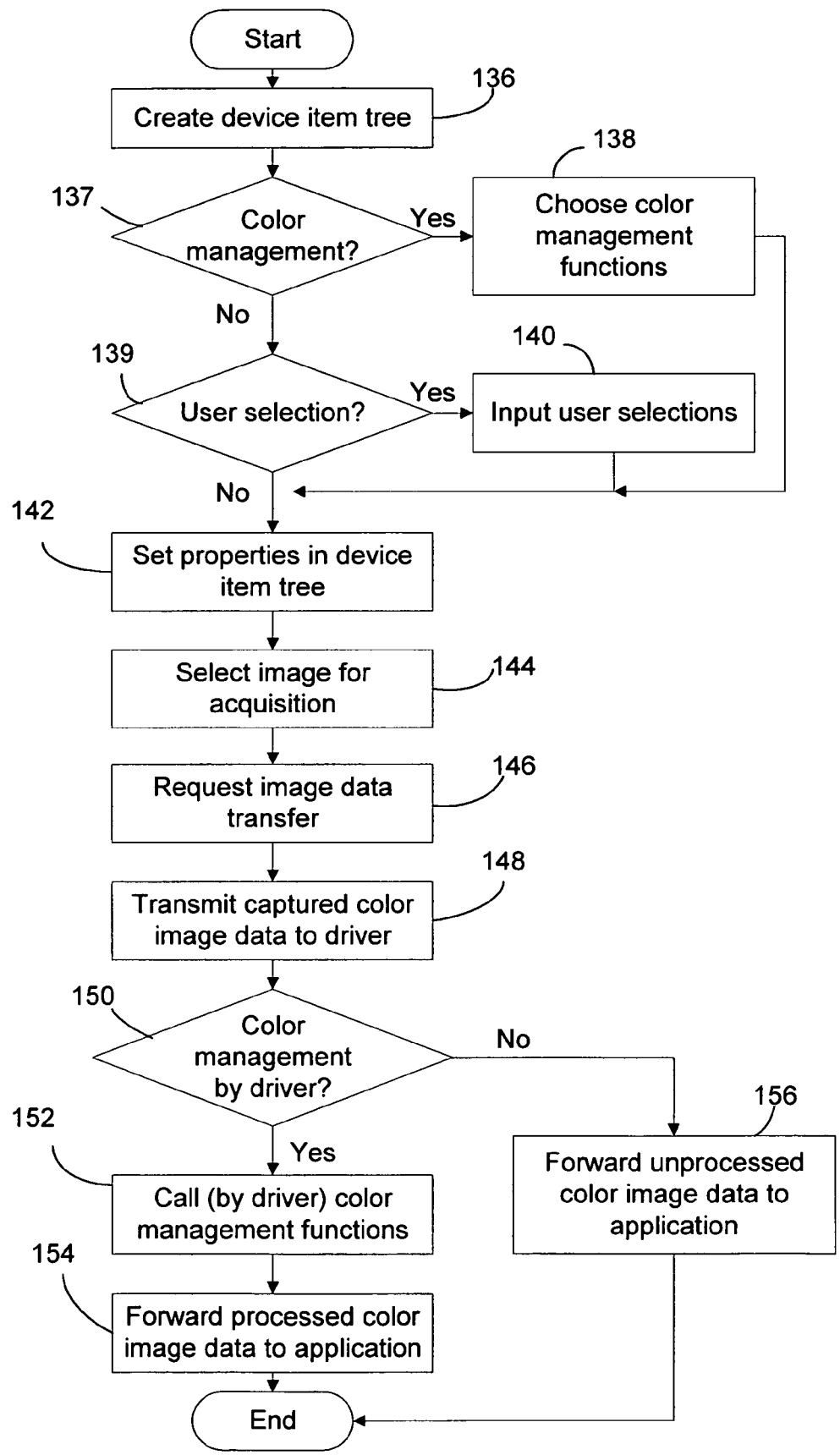
FIG. 4 is a flowchart showing an image acquisition process in the embodiment of FIG. 2 in which color management may be applied to color image data provided by an image-capturing device.

The process of selectively applying color management to captured color images in the embodiment of FIG. 2 is now described with reference to FIG. 4. When an application 78 connects to an image-capturing device 100, the image acquisition service 100 creates a device item tree that represents the device and its images and/or folders (step 136). The application can select and connect to a device without user input, or it can display a dialog box that allows a user to select a device. Also, the application can decide whether to apply any color management to a captured image (step 137). If so, the color management choices are made (step 138). Alternative, the decision to apply color management and color management choices may be made by the user through a user interface or by the Image Acquisition Service. The color management choices may include, for instance, whether the color conversion is via standard color spaces for performance and size considerations or via ICC profiles, which allow greater flexibility but are more complex to handle. If ICC profiles are to be used, the application may decide whether to store the results with an embedded profile. Also, if the application does not want to make color management choices, it may decide to present available color management choices to the user through a user interface (step 139), and the user selections are entered (step 140). Alternatively, even if the application does not utilize the color management, the image acquisition system may still make choices of color management. For example, the image acquisition system may decide whether to embed profiles with the color images. This allows, for instance, color data captured by a digital camera to be processed using a custom profile provided by the user of that camera.

Using the image acquisition API functions, the application can read and set the properties of the items in the device tree (step 142). After the image-capturing device has been selected, the application calls an appropriate API method to select an image item from the item tree of that device for data acquisition (step 144). To that end, another API method may be called to display a dialog box that allows a user to select an image from a specified device. User selection is optional, however, and the application preferably can determine which image item in the device item tree is to be selected. The selected image item (e.g., the image item 130 of FIG. 3) represents the image to be captured by the image-capturing device, and the property settings of the image item provide the parameters for the device to perform the image capturing operation. One or more of the properties (e.g., the properties 134 of the image item 130 of FIG. 3) of the image item may be used to indicate whether color management is to be applied to the captured image data and/or which color management operations are to be performed by the device driver.

Once the image item representing the desired image has been selected and its properties set, the application can request (through the Image Acquisition Service by calling an API method) the device to transfer the image data (step 146). In response to this data transfer request, the device driver controls the image-acquisition to start the image acquisition operation. The captured color image data are then transmitted to the device driver (step 148) by the image-capturing device.

The way the captured color image data are forwarded to the application depends on how the image item representing the captured image is set up. If the properties of the image item are set to indicate that color management is to be performed (step 150), the color image data received from the image device are stored in a buffer 136 (FIG. 2) in the memory space of the system. The device driver then calls the appropriate functions of the color management to perform the desired color operations on the color image data (step 152). As described above, the color operations may involve the conversion of the received color data from the native color space of the image device to a desired color space, such as the sRGB color space, based on the ICC profile of the image device. Other types of color management operations may also be performed by the device driver on the data. The processed or "color-managed" color image data are then forwarded through the Image Acquisition Service to the image-processing application (step 154). On the other hand, if the properties of the image item indicate that no color management is to be applied at the device driver level, the device driver simply forwards the color image data received from the image driver to the application via the Image Acquisition Service (step 156).

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable components for acquiring color images using an image-capturing device for use by an application, comprising:

a color management component of an operating system having color management functions for performing color management operations;

an image acquisition interface for calling by the application to set image acquisition control parameters in an image acquisition control data structure, said image acquisition control parameters including a color management parameter indicating whether color management is required;

a device driver for the image-capturing device, the device driver controlling the image-capturing device to start an image-capturing operation according to the image acquisition control parameters in response to a data acquisition request by the application, receiving color image data for a captured image from the image-capturing device, and invoking a color management function of the color management component to operate on the color image data of the captured image when the color management parameter is set to indicate that color management is required;

a color management application programming interface for calling by the device driver to invoke color management functions of the color management component; and an image acquisition service module operating between the image-processing application and the device driver to deliver requests by the application to the device driver and forwarding color image data from the device driver to the application.

2. A computer-readable medium as in claim 1, wherein the color management function called by the device driver performs a color space conversion that converts the color image data from a color space of the image-capturing device to a destination color space.

3. A computer-readable medium as in claim 2, wherein the destination color space has a substantially linear gamma with respect to uniform human perception.

4. A computer-readable medium as in claim 3, wherein the destination color space is the sRGB color space.

5. A computer-readable medium as in claim 2, wherein the destination color space has a substantially linear gamma with respect to luminance.

6. A computer-readable medium as in claim 5, wherein the destination color space is the scRGB color space.

7. A computer-readable medium as in claim 2, wherein the color space conversion is based on a color profile of the image-capturing device.

8. A computer-readable medium as in claim 7, wherein the color space conversion includes embedding a destination profile of the destination color space in the converted color image data.

9. A computer-readable medium as in claim 7, wherein the color profile of the image-capturing device is identified as one of the operation parameters of the image-capturing device.

10. A computer-readable medium as in claim 1, wherein the device driver forwards the color image data received from the image-capturing device to the image-processing application without performing color management thereon when the color management parameter is set to indicate that no color management is required.

11. A computer-readable medium as in claim 10, wherein the color image data of the captured image has a source color profile embedded therein.

12. A computer-readable medium having computer-executable instructions for performing steps by a device driver for controlling an image-capturing device for generating color image data for use by an application, the instructions operable to perform a process comprising the steps of:
   checking image acquisition control parameters in an image acquisition control data structure, said image acquisition control parameters being set by the application and including a color management parameter indicating whether color management is to be performed;
   controlling the image-capturing device to perform an image-capturing operation according to the image acquisition control parameters in response to an acquisition request by the application;
   receiving from the image-capturing device color image data generated in the image-capturing operation;
   calling a color management application programming interface to invoke a color management function of a color management component of an operating system to process the color image data received from the image-capturing device when the color management parameter is set to indicate that color management is to be performed; and
   forwarding the processed color image data to the application via an image acquisition service module, the image acquisition service module operating between the application and the device driver to deliver requests by the application to the device driver and forwarding color image data from the device driver to the application.

13. A computer-readable medium as in claim 12, wherein the called color management function performs a color space conversion that converts the color image data from a color space of the image-capturing device to a destination color space.

14. A computer-readable medium as in claim 13, wherein the destination color space has a substantially linear gamma with respect to uniform human perception.

15. A computer-readable medium as in claim 14, wherein the destination color space is the sRGB color space.

16. A computer-readable medium as in claim 13, wherein the destination color space has a substantially linear gamma with respect to luminance.

17. A computer-readable medium as in claim 16, wherein the destination color space is the scRGB color space.

18. A computer-readable medium as in claim 17, wherein the color profile of the image-capturing device is identified as one of the operation parameters of the image-capturing device.

19. A computer-readable medium as in claim 13, wherein the color space conversion is based on a color profile of the image-capturing device.

20. A computer-readable medium as in claim 12, having further computer-executable instructions for performing the step of forwarding the color image data received from the image-capturing device to the image-processing application without performing color management thereon when the color management parameter is set to indicate that no color management is required.

21. A computer system comprising:
   an image-capturing device;
   a color management component of an operating system having color management functions for performing color management operations;
   an image acquisition interface for calling by an application to set image acquisition control parameters in an image acquisition control data structure, said image acquisition control parameters including a color management parameter indicating whether color management is required;
   a device driver for the image-capturing device, the device driver controlling the image-capturing device to start an image-capturing operation according to the image acquisition control parameters in response to a data acquisition request by the application, receiving color image data for a captured image from the image-capturing device, and invoking a color management function of the color management component to process the color image data of the captured image when the color management parameter is set to indicate that color management is required;
   a color management application programming interface for calling by the device driver to invoke color management functions of the color management component of the operating system; and
   an image acquisition service operating between the image-processing application and the device driver to deliver requests by the application to the device driver and forwarding color image data from the device driver to the application.

22. A computer system as in claim 21, wherein the color management function called by the device driver performs a color space conversion that converts the color image data from a color space of the image-capturing device to a destination color space.

23. A computer system as in claim 22, wherein the color space conversion is based on a color profile of the image-capturing device, and wherein the color profile of the image-capturing device is identified as one of the operation parameters of the image-capturing device.

24. A computer system as in claim 21, wherein the device driver is programmed to forward the color image data received from the image-capturing device to the image-processing application without performing color management thereon when the color management parameter is set to indicate that no color management is required.

25. A method of controlling an image-capturing device for generating color image data for use by an application, comprising the steps of:
   checking image acquisition control parameters in an image acquisition control data structure, said image acquisition control parameters being set by the application and including a color management parameter indicating whether color management is to be performed;
   controlling the image-capturing device to perform an image-capturing operation according to the image acquisition control parameters in response to an acquisition request by the application;

receiving from the image-capturing device color image data generated in the image-capturing operation;

calling a color management application programming interface to invoke a color management function of a color management component of an operating system to process the color image data received from the image-capturing device when the color management parameter is set to indicate that color management is to be performed; and forwarding the processed color image data to the application via an image acquisition service module, the image acquisition service module operating between the application and the device driver to deliver requests by the application to the device driver and forwarding color image data from the device driver to the application.

26. A method as in claim 25, wherein the called color management function performs a color space conversion that converts the color image data from a color space of the image-capturing device to a destination color space.

27. A method as in claim 26, wherein the color space conversion is based on a color profile of the image-capturing device, and wherein the color profile of the image-capturing device is identified as one of the operation parameters of the image-capturing device.

28. A method as in claim 25, including the step of forwarding the color image data received from the image-capturing device to the image-processing application without performing color management thereon when the color management parameter is set to indicate that no color management is required.

* * * * *